(12) United States Patent
Srinivasan et al.

(10) Patent No.: US 9,456,395 B2
(45) Date of Patent: Sep. 27, 2016

(54) RESUME HANDLING AFTER TUNE-AWAY

(71) Applicant: QUALCOMM Incorporated, San Diego, CA (US)

(72) Inventors: Shivratna Giri Srinivasan, San Diego, CA (US); Supratik Bhattacharjee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 215 days.

(21) Appl. No.: 13/767,718

(22) Filed: Feb. 14, 2013

(65) Prior Publication Data

US 2013/0215869 A1  Aug. 22, 2013

Related U.S. Application Data

(60) Provisional application No. 61/599,849, filed on Feb. 16, 2012.

(51) Int. Cl.
| | |
|---|---|
| *H04W 36/14* | (2009.01) |
| *H04W 36/00* | (2009.01) |
| *H04W 36/16* | (2009.01) |
| *H04W 36/24* | (2009.01) |
| *H04W 60/00* | (2009.01) |

(Continued)

(52) U.S. Cl.
CPC .......... *H04W 36/14* (2013.01); *H04W 36/0022* (2013.01); *H04W 36/16* (2013.01); *H04W 36/24* (2013.01); *H04W 60/005* (2013.01); *H04W 48/16* (2013.01); *H04W 68/00* (2013.01); *H04W 88/06* (2013.01)

(58) Field of Classification Search
CPC ... H04W 36/14; H04W 36/24; H04W 36/16; H04W 36/0022; H04W 60/005; H04W 48/16; H04W 88/06; H04W 68/00
See application file for complete search history.

(56) References Cited

U.S. PATENT DOCUMENTS

| | | |
|---|---|---|
| 5,457,680 A | 10/1995 | Kamm et al. |
| 6,937,861 B2 | 8/2005 | Vanghi |

(Continued)

FOREIGN PATENT DOCUMENTS

| | | |
|---|---|---|
| EP | 1562387 A1 | 8/2005 |
| WO | 0167794 A1 | 9/2001 |

OTHER PUBLICATIONS

"Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 10.6.0 Release 10)", Technical Specification, European Telecommunications Standards Institute (ETSI), 650, Route Des Lucioles; F-06921 Sophia-Antipolis; France, vol. 3GPP SA 2, No. V10.6.0, Jan. 1, 2012, XP014069291.

(Continued)

*Primary Examiner* — Joshua Kading
(74) *Attorney, Agent, or Firm* — Patterson & Sheridan, L.L.P.

(57) ABSTRACT

Methods and apparatus for resuming operations with an LTE network are described. One example method generally includes suspending operations with a base station of a first radio access technology (RAT) network (e.g., LTE network), tuning to a second RAT network (e.g., 1x network) to monitor for paging messages targeting the UE, and determining whether or not to resume operations with the base station of the first RAT network without performing system acquisition based, at least in part, on how much time has elapsed since suspending operations.

24 Claims, 6 Drawing Sheets

(51) Int. Cl.
*H04W 68/00* (2009.01)
*H04W 88/06* (2009.01)
*H04W 48/16* (2009.01)

(56) References Cited

U.S. PATENT DOCUMENTS

| | | | |
|---|---|---|---|
| 2002/0006805 A1* | 1/2002 | New et al. | 455/525 |
| 2002/0111169 A1* | 8/2002 | Vanghi | 455/436 |
| 2006/0189346 A1 | 8/2006 | Turner et al. | |
| 2008/0056214 A1* | 3/2008 | Low et al. | 370/338 |
| 2009/0285157 A1* | 11/2009 | Yeoum et al. | 370/328 |
| 2010/0172301 A1 | 7/2010 | Watfa et al. | |
| 2010/0260147 A1 | 10/2010 | Xing et al. | |
| 2010/0323696 A1 | 12/2010 | Cherian et al. | |
| 2011/0092198 A1 | 4/2011 | Miyata | |
| 2011/0117912 A1 | 5/2011 | Mahajan et al. | |
| 2011/0199915 A1 | 8/2011 | Santhanam et al. | |
| 2011/0217969 A1 | 9/2011 | Spartz et al. | |
| 2011/0268109 A1 | 11/2011 | Miyata | |
| 2012/0294173 A1* | 11/2012 | Su | H04W 24/10 370/252 |

OTHER PUBLICATIONS

International Search Report and Written Opinion—PCT/US2013/026369—ISA/EPO—Apr. 26, 2013.
Taiwan Search Report—TW102105571—TIPO—Oct. 7, 2014.

* cited by examiner

|  | After measurement gap in connected mode | "Resume" after "Suspend" (Filter state/loop gains) |
| --- | --- | --- |
| Cell frame boundary | Resume | Resume |
| Doppler Estimation | Resume state | Resume state if tau < threshold2 sec, else reset state |
| CE coherent IIR | Reset state | Reset state |
| CE SE | Resume state | Resume state if tau < threshold1 ms, else reset state if threshold1 < tau < threshold2 |
| CE SNE | Resume state | Resume state if tau < threshold1 ms, else reset state if threshold1 < tau < threshold2 |
| AGC LNA | Resume state | Resume state if tau < threshold2 sec |
| AGC DVGA | Resume state | Resume state if tau < threshold2 sec |
| FTL rotator/Rx re-sampler/Tx-PLL/Tx-resampler | Resume state | Resume state if tau < threshold2 sec |
| FTL SNR estimation | Reset state | Resume state if tau < threshold2 sec |
| TTL | Resume state | Resume state if tau < threshold2 sec |

FIG. 4

RESUME HANDLING AFTER TUNE-AWAY

CLAIM OF PRIORITY UNDER 35 U.S.C. §119

This application claims benefit of U.S. Provisional Patent Application No. 61/599,849, filed Feb. 16, 2012, which is herein incorporated by reference in its entirety.

BACKGROUND

1. Field

Aspects of the present disclosure relate generally to wireless communication systems and, more particularly, to techniques for improving performance when resuming operations in a first radio access network (RAN) after suspending operations.

2. Background

Wireless communication networks are widely deployed to provide various communication content such as voice, video, packet data, messaging, broadcast data, and the like. These wireless networks may be multiple-access networks capable of supporting multiple users by sharing the available network resources. Examples of such multiple-access networks include code division multiple access (CDMA) networks, time division multiple access (TDMA) networks, frequency division multiple access (FDMA) networks, orthogonal FDMA (OFDMA) networks, and single-carrier FDMA (SC-FDMA) networks.

Certain techniques have been designed to provide wireless device operational modes that comply with requirements established for operations on certain frequency bands of radio access networks (RANs). One such technique involves a wireless device receiving voice service from a legacy network (e.g., a CDMA 2000 1x or simply "1x" network) which provides service that geographically overlaps the service of an enhanced network (e.g., a long term evolution—LTE network).

When not engaged in a voice call, a single-radio device (e.g., a user equipment-UE) tunes to the enhanced network to obtain non-voice data services, and monitors for paging transmissions signaling a forthcoming 1x voice call. During voice calls, transmitting and receiving is suspended on the enhanced network. Thus, a limitation of this technique is that a single radio device may not simultaneously handle 1x voice sessions and non-voice data sessions.

Some devices may be capable of simultaneously communicating over multiple radio access networks (RANs) via the use of multiple radios (RF chains). These devices may be able to avoid many of the limitations imposed by having to tune a single radio to various networks, but still present various challenges, for example, in terms of increased cost and power consumption.

SUMMARY

In an aspect of the present disclosure, a method for wireless communications at a user equipment (UE) capable of communicating via first and second radio access technology (RAT) networks is provided. The method generally includes suspending operations with a base station of the first RAT network, tuning to the second RAT network to monitor for paging messages targeting the UE, resuming operations with the base station of the first RAT network without performing system acquisition if time elapsed since suspending operations is below a first threshold value, and taking one or more actions to speed performing of one or more functions when operations are resumed without performing system acquisition.

In an aspect of the present disclosure, an apparatus for wireless communications at a user equipment (UE) capable of communicating via first and second radio access technology (RAT) networks is provided. The apparatus generally includes means for suspending operations with a base station of the first RAT network, means for tuning to the second RAT network to monitor for paging messages targeting the UE, means for resuming operations with the base station of the first RAT network without performing system acquisition if time elapsed since suspending operations is below a first threshold value, and means for taking one or more actions to speed performing of one or more functions when operations are resumed without performing system acquisition.

In an aspect of the present disclosure, an apparatus for wireless communications at a user equipment (UE) capable of communicating via first and second radio access technology (RAT) networks is provided. The apparatus generally includes at least one processor configured to suspend operations with a base station of the first RAT network, tune to the second RAT network to monitor for paging messages targeting the UE, resume operations with the base station of the first RAT network without performing system acquisition if time elapsed since suspending operations is below a first threshold value, and take one or more actions to speed performing of one or more functions when operations are resumed without performing system acquisition.

In an aspect of the present disclosure, a computer program product for wireless communications at a user equipment (UE) capable of communicating via first and second radio access technology (RAT) networks, comprising a computer readable medium having instructions stored thereon is provided. The instructions are generally executable by one or more processors for suspending operations with a base station of the first RAT network, tuning to the second RAT network to monitor for paging messages targeting the UE, resuming operations with the base station of the first RAT network without performing system acquisition if time elapsed since suspending operations is below a first threshold value, and taking one or more actions to speed performing of one or more functions when operations are resumed without performing system acquisition.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates an example implementation of how various loops and algorithms may be handled upon resumption from suspended operations, in accordance with certain aspects of the present disclosure.

DETAILED DESCRIPTION

Figure 1:
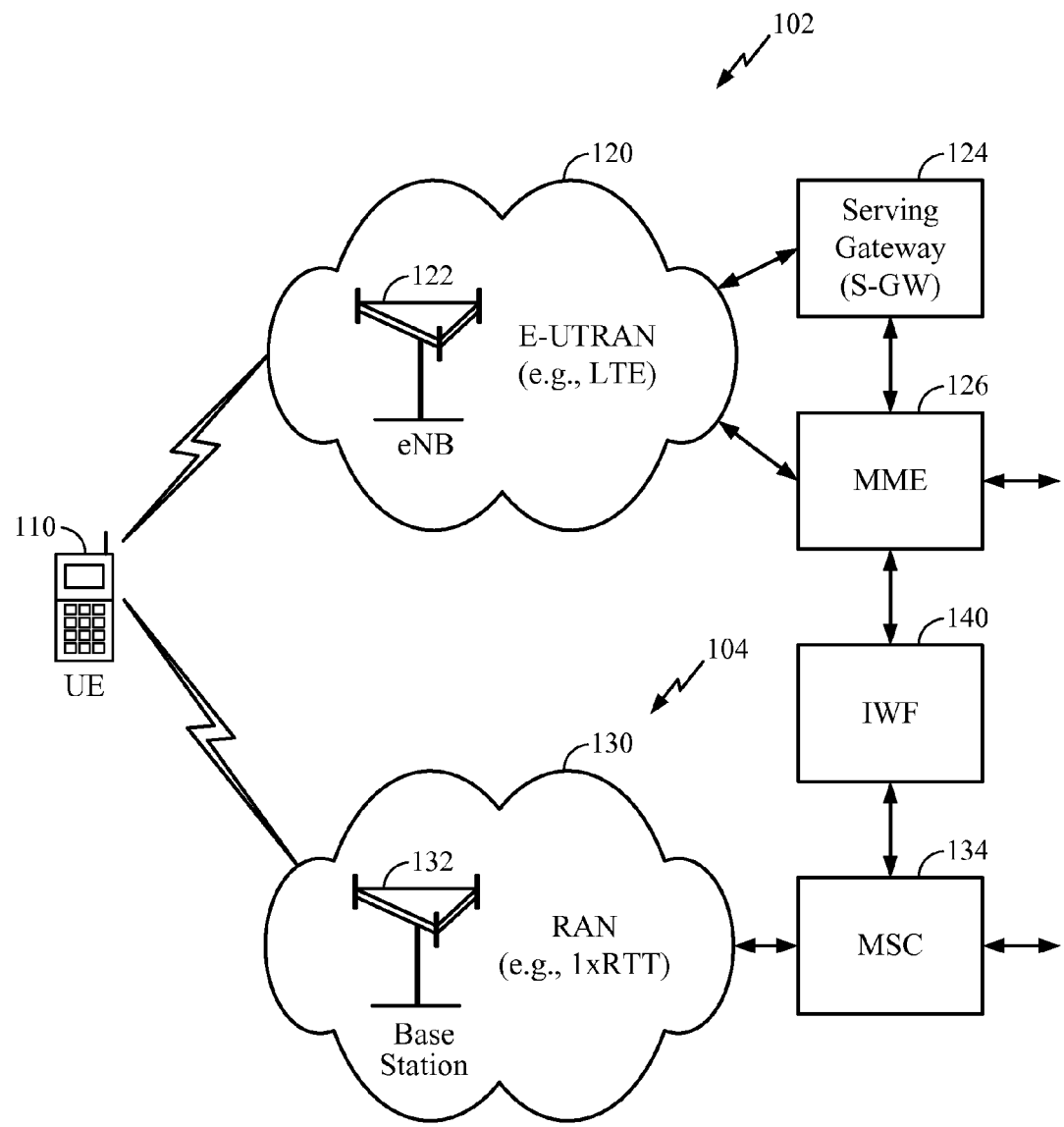
FIG. 1 illustrates an exemplary deployment in which multiple wireless networks have overlapping coverage.

Aspects of the present disclosure provide techniques that may help improve performance when resuming operations in a first radio access network (RAN) after suspending operations, for example, to perform measurements in a second RAN.

UEs with single radios that support multiple radio access technology (RAT) networks have to share the single RF chain between the different RAT networks. As an example, a single radio UE is not able to actively communicate in both LTE and CDMA (1x) RAT networks at the same time. The single radio design helps achieve improved battery power consumption. However, a problem arises when the UE has to periodically monitor 1x voice pages while an LTE data call is active.

During the RF-tune time to 1x, the LTE call is virtually suspended, which may lead to disruption in LTE UE functions, that might not expected by the network. This may have many adverse impacts for the LTE call on resumption. For example, the UE typically maintains several control algorithms to perform channel estimation, Doppler estimation, automatic gain control (AGC), frequency timing, and the like. Upon returning to the LTE after suspending operations, considerable delays may be experienced as these loops are reset and take time to converge.

Aspects of the present disclosure provide techniques that may help improve the speed of convergence of various control loops when a UE state changes, for example, from and idle state to a full state when resuming operations in a RAT network (e.g., from an LTE-idle state to a LTE-Full state). The techniques may involve changes, relative to conventional UE behavior, on resumption after a tune-away to a 1x network. The proposed changes may improve the speed of convergence of various control loops when the state changes, for example, from 'LTE-Idle' to 'LTE-Full,'

The techniques may be utilized, for example, when a UE suspends operations in an LTE network as part of a Circuit-switched fallback (CSFB) procedure. CSFB generally refers to a technique to deliver voice-services to a mobile device (UE) in certain situations when the device is camped in a long-term evolution (LTE) network. This may be required when the LTE network does not support voice services natively and needs to rely on a different type network for voice services, such as a 1x network. The LTE network and a 1x network with overlapping coverage (e.g., CDMA or GSM) may be connected using a tunnel interface. The UE may register with the 1x network while on the LTE network by exchanging messages with the 1x core network over the tunnel interface.

If a user makes a mobile originating (MO) call, or receives a mobile terminating (MT) call, the UE may inform the LTE network that the UE is leaving for the call by initiating a call setup procedure. Thereafter, all voice data is transmitted and received over the 1x network for the duration of the call. Concurrently, transmitting and receiving on the LTE network is temporarily suspended.

Aspects of the present disclosure will be described with reference to a multi-mode system, in which a user equipment (UE) is capable of supporting 1x and LTE networks for CSFB as a specific, but not limiting application example to facilitate understanding.

However, those skilled in the art will recognize that the techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1x radio transmission technology (1xRTT), CDMA2000 1X, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs. For clarity, certain aspects of the techniques are described below for LTE and 1xRTT.

FIG. 1 shows an exemplary deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments (UEs). Each eNB may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support 1xRTT and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. An inter-working function (IWF) 140 may facilitate communication between MME 126 and MSC 134. The network entities in 1xRTT are described in publicly available documents from 3GPP2.

E-UTRAN 120, serving gateway 124, and MME 126 may be part of an LTE network 102. RAN 130 and MSC 134 may be part of a 1xRTT network 104. For simplicity, FIG. 1 shows only some network entities in the LTE network and the 1xRTT network. The LTE and 1 xRTT networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority assigned to each frequency. For example, the priority list may include three frequencies X, Y and Z. Frequency X may be used for LTE and may have the highest priority, frequency Y may be used for 1xRTT and may have the lowest priority, and frequency Z may also be used for 1xRTT and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

Figure 2:
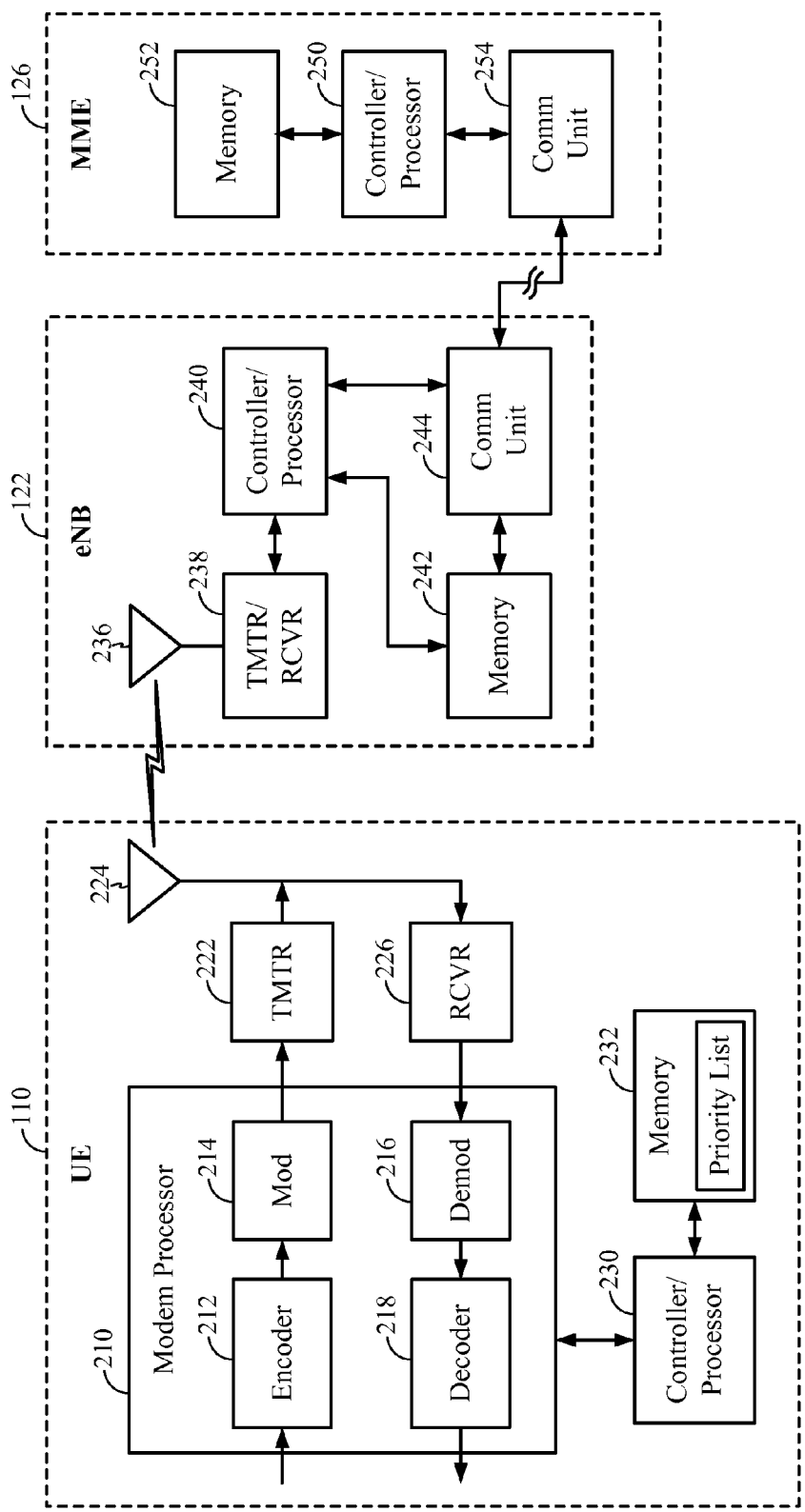
FIG. 2 illustrates a block diagram of a user equipment (UE) and other network entities.

FIG. 2 shows a block diagram of a design of UE 110, eNB 122, and MME 126 in FIG. 1. At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. In accordance with certain aspects of this disclosure, additional receivers may perform similar processes with respect to signals from additional base stations—for example, base stations associated with different, overlapping networks. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1xRTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE 110 in FIGS. 3 and 5. Memory 232 may store program codes and data for UE 110. Memory 232 may also store a priority list and configuration information.

At eNB 122, a transmitter/receiver 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122 in FIGS. 3 and 5. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126 in FIGS. 3 and 5. Memory 252 may store program codes and data for MME 126. A communication unit 254 may support communication with other network entities.

FIG. 2 shows simplified designs of UE 110, eNB 122, and MME 126. In general, each entity may include any number of transmitters, receivers, processors, controllers, memories, communication units, etc. Other network entities may also be implemented in similar manner.

Improved Resume Handling after Tune-Away

Aspects of the present disclosure provide techniques that may help improve performance when resuming operations in a first radio access network (RAN) after suspending operations, for example, to perform measurements in a second RAN. The techniques presented herein may be particularly applicable for UEs that share a single RF chain between networks.

As noted above, in some cases, it may be desirable for a device to operate with a single RF chain, for example, to reduce cost, reduce size, and limit power consumption. In such cases, the single RF chain may be shared between multiple RAT networks, for example, an LTE network for packet switched (PS) service and a 1x network for circuit switched (CS) service. Therefore, it may not be possible for LTE and 1x technologies (e.g., CDMA, GSM, or UMTS) to be active at the same time.

As noted above, issues may arise when the UE periodically monitors 1x voice pages while an LTE data call is active. During the RF-tune time to 1x, an LTE call may be virtually suspended, and this can lead to disruption in LTE UE functions that may not be expected by the network. This can have many adverse impacts on the LTE call upon resumption from the suspended operations. This architecture/algorithm of a device operating with one RF chain is generally known as suspended LTE (SLTE).

In order to minimize the impact to the LTE call on resumption from suspended operations, certain aspects of the present disclosure provide techniques for implementing behavioral changes at the UE on resumption after a tune out to a 1x network. The behavioral changes may improve the speed of convergence of various loops when the state changes from 'LTE-Idle' to 'LTE-Full'.

In general, how a UE treats each of the various control loops upon resuming operations may depend on one or more of a number of factors. Depending on these factors, the UE may either resume these control loops (e.g., assuming the same state as before operations were suspended without performing a full system acquisition) or reset the control loops (e.g., to default reset values via a system acquisition).

Techniques presented herein take advantage of the possibility that a UE may be able to recognize when it is reasonable to use previous states of control loops when resuming operations in a RAT network or RAN, rather than reset these control loops (e.g., with default values via a full system acquisition). This may be based, at least partly, on how long operations have been suspended. For example, it may be reasonable to resume previous states for control loops if operations have been suspended for only a short duration, which may make it reasonable to assume channel conditions have not changed drastically.

Figure 3A:
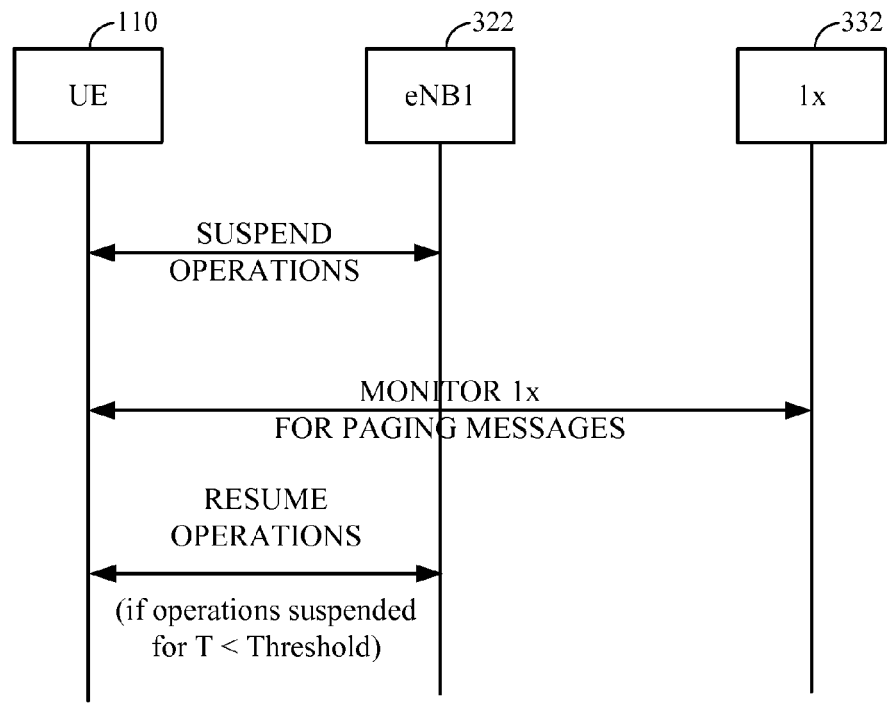
FIGS. 3A and 3B illustrate example call flow diagrams illustrating how a UE may resume operation with a first radio access technology (RAT) network after tuning away to a second RAT network, in accordance with certain aspects of the present disclosure.
Figure 3B:
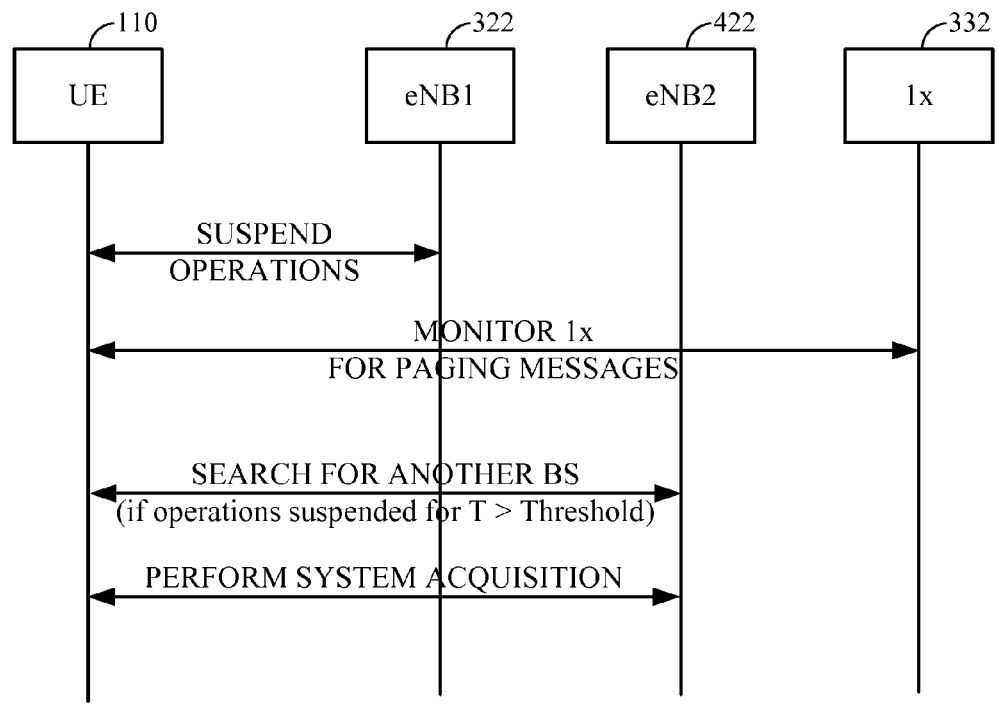

This concept may be understood with reference to FIGS. 3A and 3B, which illustrate example call flows when a UE 110 resumes operations with the LTE network from the suspended operations, in accordance with certain aspects of the present disclosure.

Referring first to FIG. 3A, it is assumed that a UE 110 is camped on an LTE network (via eNB1 322). Because the LTE network may not support voice services, the UE 502 may need to suspend operations with the LTE network and tune to a 1x network 506 to monitor for paging messages targeting the UE 502 (at 510). In some cases, the UE may actually receive 1x pages via the LTE network, in which case, the UE may only suspend operations after receiving a 1x page. The techniques presented herein may be utilized in any case where operations are suspended.

As illustrated in FIG. 3A, after some time, the UE resumes operations with the LTE network. If the amount of time that has elapsed since suspending operations is less than a threshold value, the UE 110 may resume operations with the LTE network without performing system acquisition. In this case, the UE may utilize previous states for the various control loops, such that operations may be resumed much more quickly, improving performance.

The actual threshold value may vary, depending on particular operating conditions. For example, in one case, the threshold value may be on the order of 5 seconds, which is sufficient time fo the UE to move across cell boundaries. On the other hand, if the UE is moving rapidly (e.g., as indicated by a Doppler estimate), the threshold value may be lower, for example, on the order of 1 second. In some cases, a relatively high time threshold value may be used if the Doppler estimate is low (e.g., on the order of 30 Hz or less) or a relatively low time threshold value may be used if the Doppler estimate is high (e.g., on the order of 100 Hz or greater).

On the other hand, as illustrated in FIG. 3B, if the UE resumes operations in the LTE network and the amount of time that has elapsed since suspending operations is greater than the threshold value, the UE 110 may search for another BS and perform system acquisition. In the illustrated example, the UE finds and performs system acquisition with eNB2 422, meaning control loops will be reset.

As will be described in greater detail below, the particular setting of the threshold value may vary but, generally, may be set to a value for which it is reasonable to assume the previous states of the control loops with little adverse impact. For example, the time may be set to a few milliseconds, assuming channel conditions are not likely to change drastically in that amount of time. Considerations other than time may also be considered. For example, if the UE is moving rapidly (e.g., as indicated by a Doppler estimate), system acquisition may be performed if the UE has suspended operations for a shorter threshold period. Also, exactly how different control loops are handled (whether reset or resumed) may also vary with different implementations.

FIG. 4 illustrates how various loops and algorithms may be handled on resumption from suspended operations for one such implementation, in accordance with certain aspects of the present disclosure. In conventional systems, a majority of the various loops and algorithms may be set to a reset state on resumption-with not regard to whether current states might be appropriate. In other words, upon completion of tuning to a 1x network to monitor operations for paging messages targeting the UE, the UE may initiate acquisition operations for the LTE network in order to search for another base station of the LTE network (i.e., the reset state). However, initiating acquisition operations may not always be required since the UE may still be within range of the original serving base station of the LTE network upon resumption.

According to certain aspects, it may be desirable to implement the various loops and algorithms on resumption similar to the UE behavior, for example, after a measurement gap (e.g., a 6 ms gap) in connected mode. In other words, it may be desirable to perform from a resumed state (using a previous state) rather than performing using a reset state, where the UE resumes operations with the original serving base station of the LTE network (using previous states). However, as illustrated in FIG. 4, the length of time (tau) that the UE remains in suspended operations with the original serving base station may be considered when deciding between performing a reset state or resume state.

For example, if tau is greater than a threshold value (e.g., threshold2 which may be 2.56 s), the reset state may be performed due to the fact that the UE may no longer be within range of the original serving base station of the LTE network. According certain aspects, if tau is greater than threshold2, every loop/algorithm may be reset via a full acquisition. Algorithms following this implementation may apply to Doppler estimation, automatic gain control low noise amplifier (AGC LNA), AGC digital variable gain amplifier (DVGA), frequency tracking loop (FTL) rotator, receiver resampler, transmitter phase-locked loop (PLL), transmitter resampler, FTL signal to noise ratio (SNR) estimation, time tracking loop (TTL), and spectral efficiency.

As another example, if tau is less than a threshold value (e.g., threshold1; 16 ms), operations may be resumed using previous states. However, if tau is greater than threshold1, but less than another threshold value (e.g., threshold2 2.56 s), the reset states may be used. For certain aspects, if tau is greater than threshold2, every loop/algorithm may be reset via a full acquisition. Algorithms following this implementation may apply to a variety of algorithms, such as channel estimation coherent and non-coherent energy IIR states.

According to certain aspects, if a physical broadcast channel (PBCH) or system information block (SIB) decoding for SIB-modification was missed since it was scheduled within the "suspend" duration, then the UE may reschedule PBCH/SIB1 decoding as soon as the UE resumes from the suspended operations (e.g., immediately upon resuming operations). This may avoid a potential radio link failure.

In addition, the UE may speed up various event triggering on resume if a long time elapsed during the suspended operations. In other words, if tau is greater than a threshold value, the UE may speed up event triggering for measurement reporting upon resumption on LTE. This may prevent any further loss in signal quality or delayed handovers in connected state due to a lengthy period of time spent on the 1x network for suspended operations. In some cases, the threshold value for speeding up event triggering for measurement reporting may be set to a relatively low value (e.g., on the order of 50 ms) to avoid missed reporting cycles, which may result in radio link failures (RLFs).

Figure 5:
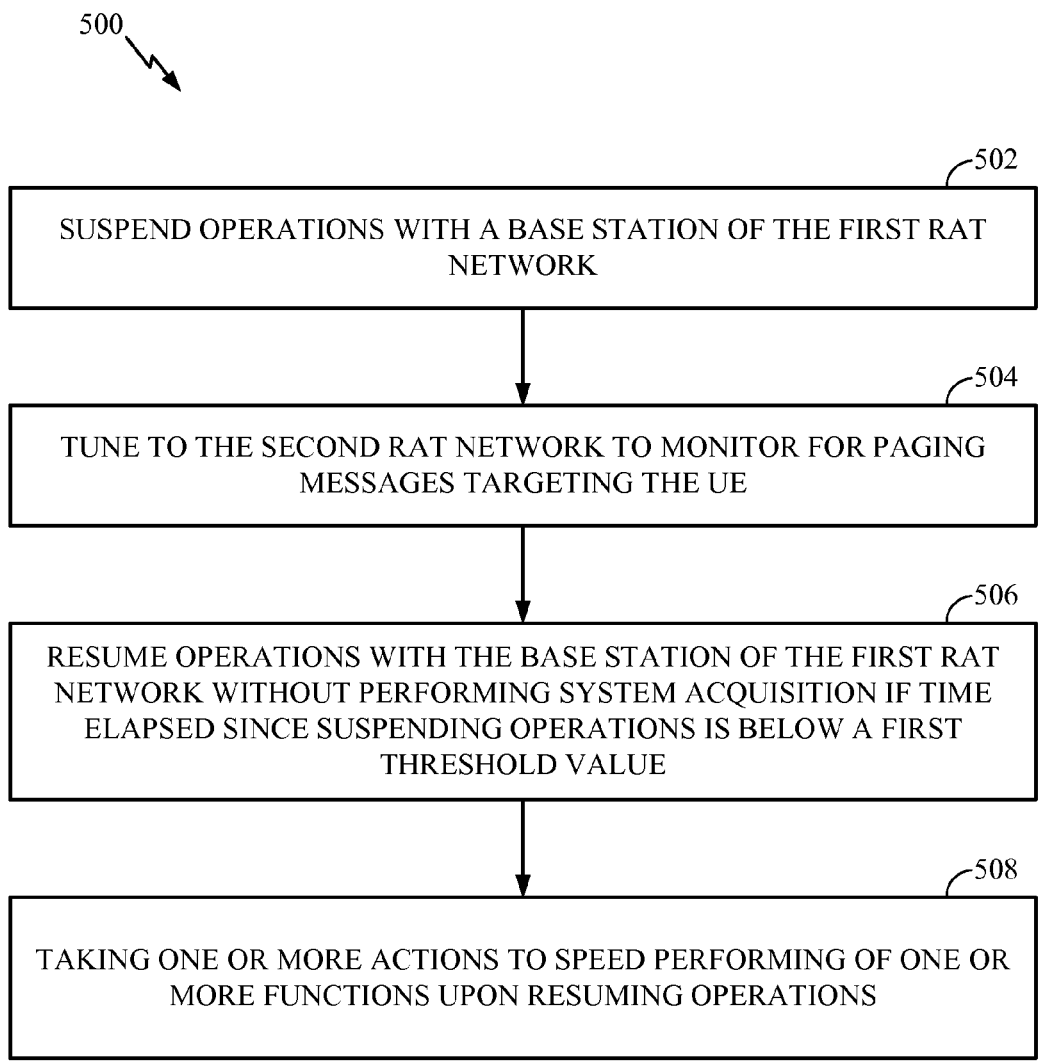
FIG. 5 illustrates example operations that may be performed by a UE to resume operations in a first RAT network after tuning away to a second RAT network, in accordance with certain aspects of the present disclosure.

FIG. 5 illustrates example operations 500 for resuming operations with a radio access technology (RAT) network (e.g., LTE network), in accordance with certain aspects of the present disclosure. The operations 500 may be performed, for example, by a UE capable of communicating via first and second RAT networks.

At 502, the UE may suspend operations with a base station of the first RAT network. At 504, the UE may tune to the second RAT network (e.g., 1x network) to monitor for paging messages targeting the UE.

At 506, the UE may resume operations with the base station of the first RAT network without performing system acquisition if time elapsed since suspending operations is below a first threshold value. At 508, the UE may take one or more actions to speed performing of one or more functions upon resuming operations.

In some cases, the actions may include decoding a message (such as a SIB or other message) earlier than would have been done if operations had not been suspended. In one particular example, a UE in normal operation may be scheduled to decode a SIB at specified times. However, if the UE determines that it missed a SIB decoding during suspension, after resuming operation the UE may decode the SIB earlier than it would have under normal operation. In one particular example, the UE decodes the SIB at the next available opportunity rather than waiting until what would have been the next specified time under normal operation.

In some cases, the actions may include speeding up event triggering for measurement reporting if the time that has elapsed since suspending operations is greater than a second threshold value. In some cases, a network may declare a radio link failure (RLF) if measurements are not reported in a given period of time. Thus, triggering measurement reporting soon after suspending operations for some amount of time (e.g., on the order of 50 ms) may help avoid RLFs.

As discussed above, in some cases, rather than just consider how long operations have been suspended, a UE may also consider other factors. For example, a UE may consider how fast a UE is moving, which may be indicated, at least to some extent by a Doppler estimate generated from before suspending operations.

Figure 6:
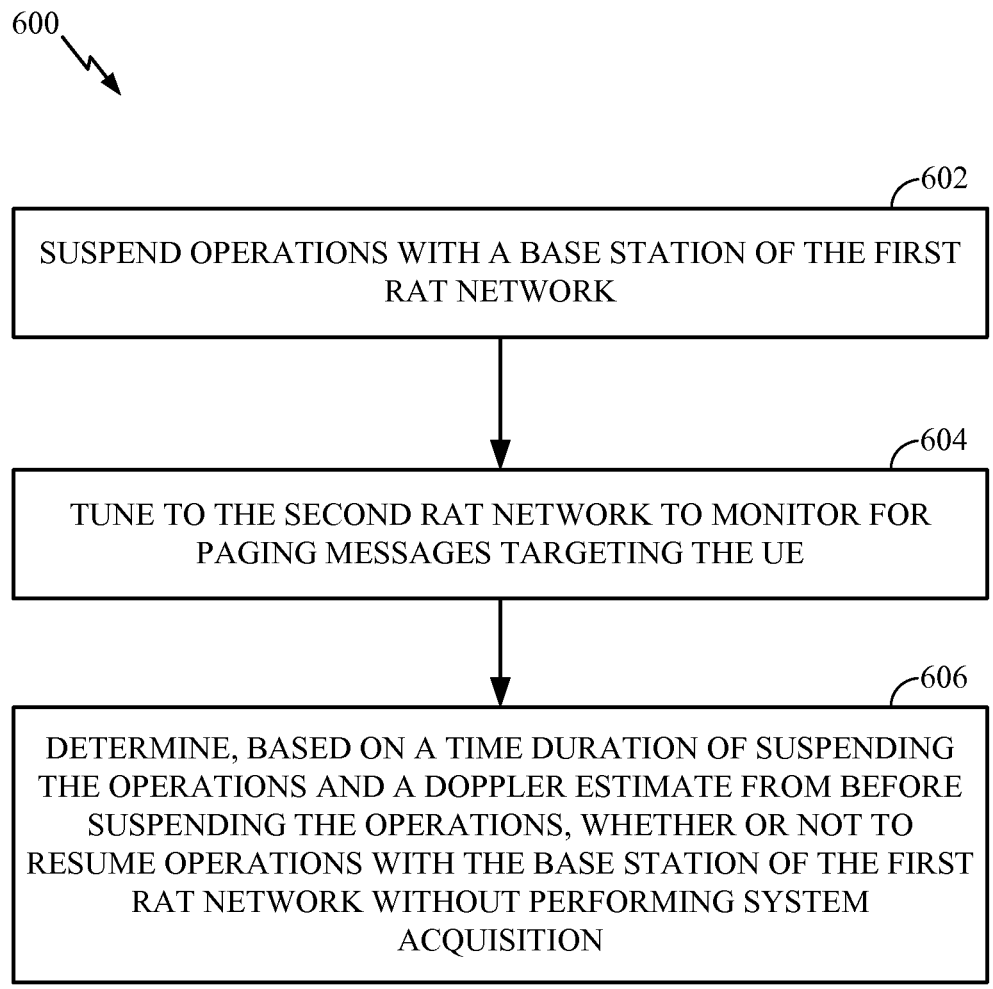
FIG. 6 illustrates example operations that may be performed by a UE to resume operations in a first RAT network after tuning away to a second RAT network based on an amount of time away and a Doppler estimate, in accordance with certain aspects of the present disclosure.

FIG. 6 illustrates example operations 600 a UE may perform for resuming operations with a radio access technology (RAT) network (e.g., LTE network), considering both time and Doppler estimate.

The operations 600 begin, at 602, with the UE suspending operations with a base station of the first RAT network. At 604, the UE tunes to the second RAT network to monitor for paging messages targeting the UE. At 606, the UE determines, based on a time duration of suspending the operations and a Doppler estimate from before suspending the operations, whether or not to resume operations with the base station of the first RAT network without performing system acquisition.

By resuming operations in a RAT network using previous states of various control algorithms, in cases when a UE deems it appropriate, a UE may improve performance and speed the resumption of operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communications at a user equipment (UE) capable of communicating via first and second radio access technology (RAT) networks, the method comprising:
   suspending operations with a base station of the first RAT network, wherein the UE used a first state of operation with the base station before suspending operations;
   tuning to the second RAT network to monitor for paging messages targeting the UE;
   resuming operations, by assuming the first state used before suspending operations, with the base station of the first RAT network without performing system acquisition when a time elapsed since suspending operations is below a first threshold value; and
   taking one or more actions to speed performing of one or more functions associated with the first RAT network earlier than originally scheduled after operations with the base station of the first RAT network are resumed without performing system acquisition.

2. The method of claim 1, wherein taking one or more actions comprises:
   detecting a missed decoding of a transmission conveying system information, that was originally scheduled during the time that has elapsed since suspending operations; and
   decoding a transmission conveying system information earlier than originally scheduled in response to the detection.

3. The method of claim 1, wherein taking one or more actions comprises:
   upon resuming operations, speeding up event triggering for measurement reporting when the time that has elapsed since suspending operations is greater than a second threshold value.

4. The method of claim 1, further comprising, when the time that has elapsed since suspending operations is greater than the first threshold value:

performing system acquisition with a base station of the first RAT.

5. The method of claim 1, wherein the first RAT comprises Long-Term Evolution (LTE).

6. The method of claim 1, wherein the second RAT comprises at least one of a Code Division Multiple Access (CDMA) Ix RAT, a Global System for Mobile (GSM) RAT, and a Universal Mobile Telecommunication System (UMTS) RAT.

7. An apparatus for wireless communications at a user equipment (UE) capable of communicating via first and second radio access technology (RAT) networks, the apparatus comprising:
  means for suspending operations with a base station of the first RAT network, wherein the UE used a first state of operation with the base station before suspending operations;
  means for tuning to the second RAT network to monitor for paging messages targeting the UE;
  means for resuming operations, by assuming the first state used before suspending operations, with the base station of the first RAT network without performing system acquisition when a time elapsed since suspending operations is below a first threshold value; and
  means for taking one or more actions to speed performing of one or more functions associated with the first RAT network earlier than originally scheduled after operations with the base station of the first RAT network are resumed without performing system acquisition.

8. The apparatus of claim 7, wherein means for taking one or more actions comprises:
  means for detecting a missed decoding of a transmission conveying system information, that was originally scheduled during the time that has elapsed since suspending operations; and
  means for decoding a transmission conveying system information earlier than originally scheduled in response to the detection.

9. The apparatus of claim 7, wherein means for taking one or more actions comprises:
  means for speeding up event triggering for measurement reporting, upon resuming operations, when the time that has elapsed since suspending operations is greater than a second threshold value.

10. The apparatus of claim 7, further comprising:
  means for performing system acquisition with a base station of the first RAT when the time that has elapsed since suspending operations is greater than the first threshold value.

11. The apparatus of claim 7, wherein the first RAT comprises Long-Term Evolution (LTE).

12. The apparatus of claim 7, wherein the second RAT comprises at least one of a Code Division Multiple Access (CDMA) Ix RAT, a Global System for Mobile (GSM) RAT, and a Universal Mobile Telecommunication System (UMTS) RAT.

13. An apparatus for wireless communications at a user equipment (UE) capable of communicating via first and second radio access technology (RAT) networks, the apparatus comprising:
  at least one processor configured to:
    suspend operations with a base station of the first RAT network, wherein the UE used a first state of operation with the base station before suspending operations,
    tune to the second RAT network to monitor for paging messages targeting the UE,
    resume operations, by assuming the first state used before suspending operations, with the base station of the first RAT network without performing system acquisition when a time elapsed since suspending operations is below a first threshold value, and
    take one or more actions to speed performing of one or more functions associated with the first RAT network earlier than originally scheduled after operations with the base station of the first RAT network are resumed without performing system acquisition; and
  a memory coupled with the at least one processor.

14. The apparatus of claim 13, wherein the processor is configured to:
  detect a missed decoding of a transmission conveying system information, that was originally scheduled during the time that has elapsed since suspending operations; and
  decode a transmission conveying system information earlier than originally scheduled in response to the detection.

15. The apparatus of claim 13, wherein the processor is configured to:
  speed up event triggering for measurement reporting, upon resuming operations, when the time that has elapsed since suspending operations is greater than a second threshold value.

16. The apparatus of claim 13, wherein the processor is configured to:
  perform system acquisition with a base station of the first RAT when the time that has elapsed since suspending operations is greater than the first threshold value.

17. The apparatus of claim 13, wherein the first RAT comprises Long-Term Evolution (LTE).

18. The apparatus of claim 13, wherein the second RAT comprises at least one of a Code Division Multiple Access (CDMA) Ix RAT, a Global System for Mobile (GSM) RAT, and a Universal Mobile Telecommunication System (UMTS) RAT.

19. A non-transitory computer readable medium for wireless communications at a user equipment (UE) capable of communicating via first and second radio access technology (RAT) networks, wherein the non-transitory computer readable medium comprises instructions executable by one or more processors for:
  suspending operations with a base station of the first RAT network, wherein the UE used a first state of operation with the base station before suspending operations;
  tuning to the second RAT network to monitor for paging messages targeting the UE;
  resuming operations, by assuming the first state used before suspending operations, with the base station of the first RAT network without performing system acquisition when a time elapsed since suspending operations is below a first threshold value; and
  taking one or more actions to speed performing of one or more functions associated with the first RAT network earlier than originally scheduled after operations with the base station of the first RAT network are resumed without performing system acquisition.

20. The non-transitory computer readable medium of claim 19, wherein taking one or more actions comprises:
  detecting a missed decoding of a transmission conveying system information, that was originally scheduled during the time that has elapsed since suspending operations; and decoding a transmission conveying system information earlier than originally scheduled in response to the detection.

21. The non-transitory computer readable medium of claim 19, wherein taking one or more actions comprises:
   upon resuming operations, speeding up event triggering for measurement reporting when the time that has elapsed since suspending operations is greater than a second threshold value.

22. The non-transitory computer readable medium of claim 19, wherein the instructions are further executable for:
   performing system acquisition with a base station of the first RAT when the time that has elapsed since suspending operations is greater than the first threshold value.

23. The non-transitory computer readable medium of claim 19, wherein the first RAT comprises Long-Term Evolution (LTE).

24. The non-transitory computer readable medium of claim 19, wherein the second RAT comprises at least one of a Code Division Multiple Access (CDMA) 1x RAT, a Global System for Mobile (GSM) RAT, and a Universal Mobile Telecommunication System (UMTS) RAT.

* * * * *